United States Patent
Boden et al.

[15] 3,650,581
[45] Mar. 21, 1972

[54] BEARING SYSTEMS

[72] Inventors: Karl Boden, Oberteuringen; Dietrich Scheffer, Friedrichshafen, both of Germany

[73] Assignee: Karl Boden, Wilhelm Groth & Dietrich Scheffer

[22] Filed: Apr. 9, 1970

[21] Appl. No.: 27,006

[30] Foreign Application Priority Data

June 30, 1969 Germany ............... P 19 33 031.5

[52] U.S. Cl. .................................................. 308/10
[51] Int. Cl. ................................................... F16c 39/06
[58] Field of Search ............... 308/10; 73/516, 503; 74/5.6, 74/5.9

[56] References Cited

UNITED STATES PATENTS

| | | | |
|---|---|---|---|
| 3,490,816 | 1/1970 | Lyman | 308/10 |
| 3,493,275 | 2/1970 | Stone | 308/10 |
| 3,124,962 | 3/1964 | Hirtreiter | 308/10 |
| 3,112,962 | 12/1963 | Lautzenhisser | 308/10 |
| 3,146,038 | 8/1964 | Lautzenhisser | 308/10 |

Primary Examiner—J. D. Miller
Assistant Examiner—R. Skudy
Attorney—Harness, Dickey and Pierce

[57] ABSTRACT

A mechanical contact-free bearing system for a rotor, e.g., in a vacuum pump operating on the Holweck principle, rotatable at high speed comprises a magnetic system which includes at least one carrier magnet for suspending the rotor with its axis vertical. The bearing system includes at least one stabilizing device for counteracting and damping gyratory movements, e.g., procession and nutation, of the rotor. The stabilizing device includes sensors for producing signals responsively to deviation of the axis of the rotor from a predetermined position. An electronic control device amplifies the sensor signals and advances them in phase to produce output signals. Electromagnetic means utilize such output signals to apply electromagnetic forces to the rotor to apply correcting lateral forces to the rotor and further forces to anticipate the gyratory effect of such correcting forces and to damp oscillations of the rotor.

36 Claims, 11 Drawing Figures

Patented March 21, 1972

INVENTORS.
Karl Boden,
BY Dietrich Scheffer
Harness, Dickey & Pierce
ATTORNEYS

Patented March 21, 1972 3,650,581

Patented March 21, 1972

INVENTORS.
Karl Boden,
BY Dietrich Scheffer
Harness, Dickey & Pierce
ATTORNEYS.

Patented March 21, 1972

INVENTORS.
Karl Boden,
BY Dietrich Scheffer
Harness, Dickey & Pierce
ATTORNEYS

BEARING SYSTEMS

The invention relates to a magnetic bearing system for a rotor, whose axis of rotation is substantially vertical, without any mechanical contact between the rotor and the stationary part in which it is journaled.

Magnetic bearing systems can be used to journal rotatable parts (rotors) without mechanical contact with the stationary part, so that no bearing friction and no wear occurs and in particular so that no lubricant is required for the operation of the bearing system. The field of application lies therefore especially in the journaling of rotors rotatable at extremely high speed and/or rotors running in vacuum or those which are in direct contact with corrosive gases which would destroy mechanical bearings. The bearing system in accordance with the invention is useful for example for the bearing systems of vacuum pumps operable in accordance with the Holweck principle. These are axial pumps, the rotors being provided on their outer wall with helical blades which transport the gases in the axial direction. A converse arrangement is also possible, wherein the helices are provided on the stationary part whilst the rotor has substantially a plain wall. These pumps must operate at maximum speed to give good efficiency. Until now the speeds had to be limited because of bearing problems and the efficiency was correspondingly low. The application of the bearing systems in accordance with the invention is not limited to this field of application however, but is suitable for all purposes where high speed and long life are required, and where the rotors are intended to operate in vessels which should be as closely sealed as possible.

A bearing system is known already wherein a rotor, whose diameter is greater than its axial length, is suspended underneath an electro magnet. The electromagnet is controlled inductively so that the distance between the rotor and the electromagnet remains constant. This bearing system is suitable only for bodies which show steady behavior according to the laws of gyration, that is, those which have a large diameter in relation to their axial length. In the case of extended rotors this bearing system fails since an adequate dampening of vibratory movements of the rotor is not possible.

Furthermore, bearing systems have become known, wherein magnetic forces contribute to the reduction of friction in mechanical bearings. All such bearing systems do however require at least one mechanical bearing, which has a limited life and which requires lubricant etc. Such reduction in friction by magnetic means cannot therefore solve the present problem.

It is a feature of the invention to provide a magnetic bearing system which operates completely mechanical contact-free, which allows the journaling of rotors of any shape, which is safe in operation and which can be made and operated at a low cost.

In accordance with the present invention, the carrier magnet produces a constant magnetic field with a vertical component for maintaining the rotor in a stable position in vertical direction. For the horizontal stabilization in a first horizontal plane a stabilizing device for the maintenance of the rotor in a specified position is provided on the stationary part, which device comprises:

a. at least two contactless sensors for measuring slow as well as higher frequency deviations of the rotor from the desired position and producing electrical error signals in accordance therewith;

b. an electronic control device for delivering said error signals amplified and phase displaced, with respect to time, as output signals, and c. electromagnetic means for the creation of substantially radially directed magnetic fields which cooperate with ferromagnetic portions on the rotor, the electromagnetic means being responsive to said output signals and adapted to control the magnetic field in such a way that their influence upon the ferromagnetic portions of the rotor produces a first component force for returning the rotor from its deviated position to the specified position.

Furthermore, a second component force is produced for counteracting a lateral deviation of the rotor brought about by the gyroscopic effect of the rotor and dampens the same. Furthermore, the magnetic bearing system has in a second horizontal plane a device for at least damping vibratory movements of the rotor by the use of magnetic fields. Thus a completely contact-free magnetic bearing system is provided which allows the journaling of rotors about a substantially vertical axis, the rotor being suspended by a carrier magnet with constant magnetic field, for example a permanent magnet. Only the lateral deviations are restored by controlled magnetic means, for example electromagnets. Since the gyroscopic effect contributes to the stabilization, the expenditure required for the control, as well the power required, are very moderate. Thus a stabilizing device was produced which for the journaling of a rotor of 2 kg. weight only required a power of 6 Watt per horizontal plane.

The invention is further described, by way of example, with reference to the accompanying drawings, in which.

Figure 1:
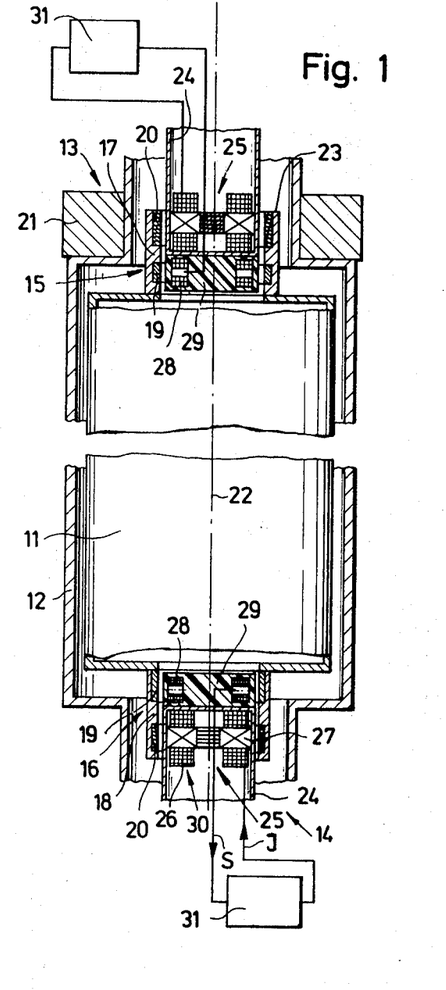
FIG. 1 is a schematic longitudinal section through a rotor and its bearing system.

Referring to FIG. 1, a rotor 11 is journaled in a stationary part 12 for rotation about a substantially vertical axis. The stationary part 12 forms a housing which can fully enclose the rotor. It consists, at least in the region of the upper and lower bearings 13, 14, of nonmagnetic material. The rotor 11 may for example be the rotor of an axial vacuum pump operating on the Holweck principle. For the sake of a simpler representation the parts of the rotor and housing which are not relevant to the understanding of the invention have been omitted. The upper and lower ends of the housing (shown broken away) may form the inlet and outlet.

The central cylindrical portion of the rotor 11 may consist of any kind of material. At its upper and lower ends the rotor 11 has hollow cylindrical attachments 15, 16 which comprise outer support rings 17, 18, sensor rings 19 and ferromagnetic rings 20. Whereas the upper support ring 17 consists of ferromagnetic material, for example steel, the lower support ring 18 may be made of ferromagnetic or nonmagnetic material. Since the rotor is to rotate at high speed, a material with a high ratio of strength to specific gravity, such as for example titanium, may be chosen for the support ring 18. The sensor rings 19 on the inside of the attachments 15, 16 consist of nonmagnetic electrically conducting material, while the ferromagnetic rings 20 are made of a material with ferromagnetic properties and small eddy-current and hysteresis losses. Suitable for the latter are annular laminations of so-called transformer sheets which are insulated from one another or a soft-magnetic, ceramic mounded (sintered) material (so-called ferrite material). The sensor and ferromagnetic rings 19, 20 are carried by the support rings 17, 18. In particular for the ferromagnetic rings 20, if they consist of ferrite material, which is usually not very strong, the support rings 17, 18 serve as connecting and carrying elements to withstand the high centrifugal forces occurring at the fast speeds of rotation of the rotor 11.

Figure 6:
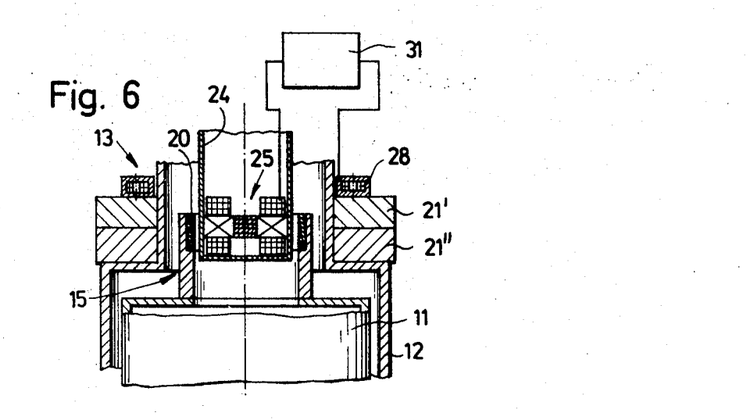
FIG. 6 is a partial schematic longitudinal section through a different embodiment of the upper bearing of FIG. 1, and FIGS. 7 to 11 are schematic longitudinal sections through other embodiments of rotors and their bearing systems.

A carrier magnet 21 is arranged outside the housing 12 in the horizontal region of the support ring 17 at the upper bearing 13. The carrier magnet 21 is of annular design and encircles the housing and consequently the upper end 15 of the rotor in a horizontal plane. The carrier magnet may comprise an axially polarized annular magnet (FIG. 1) or a stack of such annular magnets (FIG. 6). It is also possible to assemble the carrier magnet from several magnet segments. It is important that the entire annulus is magnetized as homogeneously as possible and that it provides an axial magnetic field strength component which is sufficiently strong to carry the weight of the rotor. Its poles are situated at the upper and lower faces of the annulus and produce a magnetic field which is as accurately as possible symmetrical about the axis 22 of rotation of the rotor.

The carrier magnet 21 cooperates with the ferromagnetic portions at the upper end 15 of the rotor, primarily with the ferromagnetic support ring 17. The magnetic lines of force run from one face of the carrier magnet 21 through the support ring 17 to the other face of the carrier magnet. The magnetizing force of the carrier magnet 21 is so dimensioned that, in cooperation with the ferromagnetic portions of the rotor, it can safely carry the weight of the rotor 11 or any axial force arising on the same. The upper face 23 of the ferromagnetic portions of the rotor will normally be located in the region of the carrier magnet and will adopt an axial position corresponding to the forces arising.

Stationary gastight sleeves 24 of nonmagnetic, electrically conductive material project into the hollow ends 15, 16 of the rotor. Electromagnetic means 25 for producing horizontally directed variable magnetic fields are arranged in these sleeves 24. In the embodiment shown the electromagnetic means comprise four electromagnetic windings 26 which are offset relative to one another by 90° in a horizontal plane. Their cores 27, comprise stacked transformer sheet combined to form a cross. Alternatively these cores may be a solid mass.

Contactless sensors 28 are arranged at the ends of the sleeves 24 adjacent the rotor. Four sensors are associated with each bearing and each sensor is located in the same vertical plane as a corresponding magnet of the electromagnetic means 25. The sensors 28 are inductive pickups responsive to movement, e.g., a core having windings thereon whose inductance varies when the distance of the associated sensor ring 19 from the core varies.

In the embodiment shown, the sensor ring 19 comprises a non-ferromagnetic, electrically conductive material. When it approaches a sensor 28 the inductance of the latter is lowered owing to the presence of eddy currents. This realization is preferred, because the characteristic of the sensor in this case is always stable, i.e., only one sensor indication is associated with each distance.

If ferromagnetic material is used for the ring 19, the inductance of the sensor is increased as it approaches. This characteristic too can be stable if the ferromagnetic material has a low conductivity. If this condition is not met, the sensor may, in an undesirable manner, give ambiguous signals.

The sensors 28 are encased in a nonmetallic gastight material 29, for example moulded plastics. Each two electromagnets 30 facing one another and two sensors 28 located in the same vertical plane are connected to one another through an electric control device 31. The latter will be explained in detail hereinafter.

Figure 2:
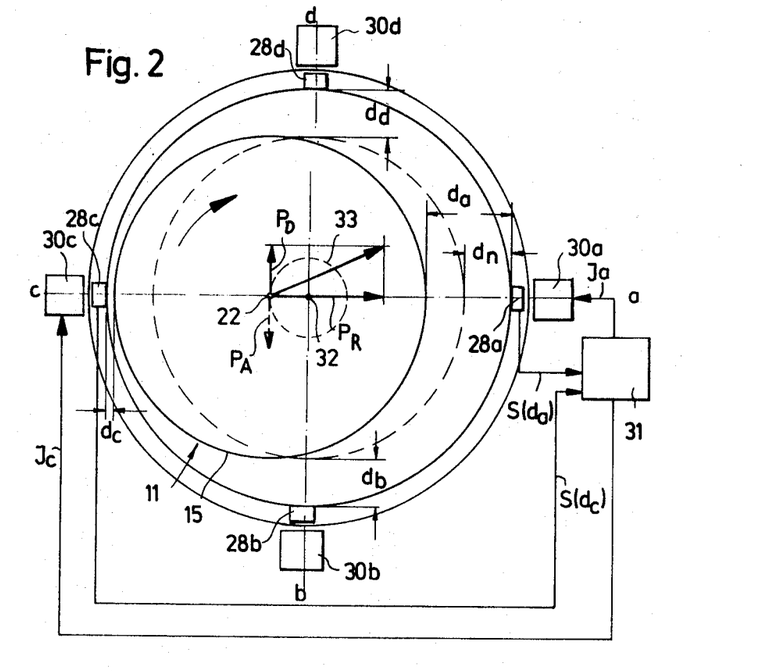
FIG. 2 is a schematic representation of the positions and forces in a horizontal plane of one of the bearings of the bearing system.
Figure 3:
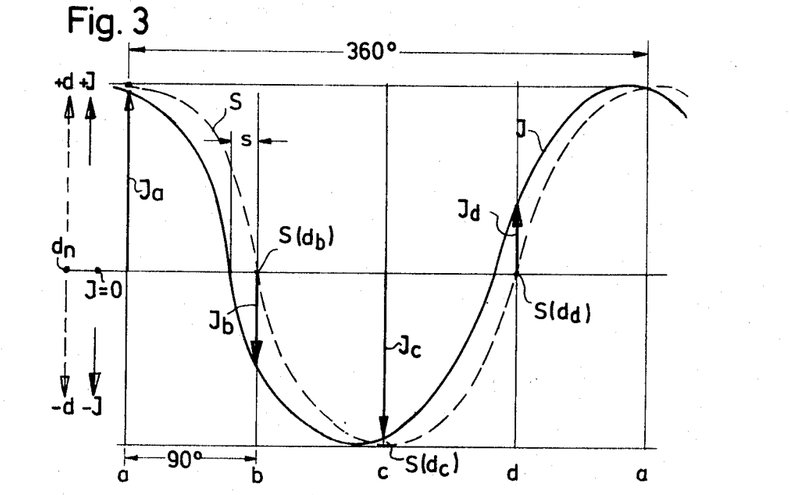
FIG. 3 is a graph of the error and output signals occurring in the case represented in FIG. 2.
Figure 9:
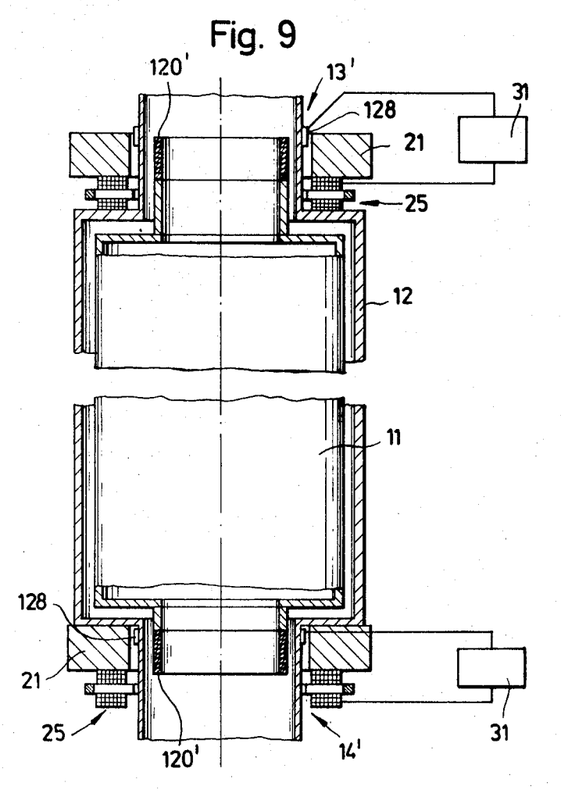

In FIGS. 2 and 3 it is shown schematically, how horizontal deviations of the rotary axis 22 of the rotor from its specified position (desired axis 32 of rotation) are counteracted or avoided. FIG. 2 represents a highly schematic horizontal section through a bearing, where four electromagnets 30a to 30d with their associated sensors 28a to 28d are arranged around a rotor end 15 (for example as shown in FIG. 9). The four electromagnets 30a to 30d with their sensors 28a to 28d are marked in the sense of rotation consecutively by the letters a, b, c, d. Let it be assumed that the rotor end 15 has just been subjected to a deflection in the direction of c. The sensor 28a indicates therefore an excessively great distance $d_a$ and produces a signal S ($d_a$) whilst the sensor 28c indicates an excessively small distance $d_c$ and produces a signal S ($d_c$). The sensors 28b and 28d indicate the distances $d_b$ and $d_d$ which are equal to the desired distance $d_n$.

The stabilizing device, comprising the sensors 28a to 28d, the magnetic means 25, in this case the four electromagnets 30a to 30d and the control device 31, now has the task of restoring the position of the rotor in such a way that its axis 22 of rotation once more coincides with the desired axis 32 of rotation. It should be mentioned that a deflection, as shown in FIG. 2, is not stationary, i.e., in the case of a spinning gyro the axis 22 of rotation itself describes an orbit around the desired axis 32 of rotation, as shown by the broken circle line 33. The movement of the axis 22 on a circular orbit is the simplest case of the phenomenon of gyratory movement known as a precession. This movement may be superimposed by so-called nutation movements.

The signals S($d_a$) to S($d_d$) are therefore periodic and in their simplest form are sinusoidal waves, as shown in FIG. 3. In the control device 31 the sensor signals S ($d$) are amplified and phase-displaced. Such phase displacement $s$, within the frequency range occurring in practice (possible precession and nutation frequencies), alters with the frequency of the sensor signals in such a way that at high frequency a greater phase displacement takes place and at lower frequency a smaller phase displacement. Each control device 31 delivers as output signal a current J whose variations with respect to time correspond to those of the sensor signals S, and which leads the sensor signals S by a phase displacement $s$ which amounts to between 0° and 90° (FIG. 3). Thus the electromagnet 30a receives a current Ja, and consequently produces a magnetic field which exerts on the rotor a restoring force $P_R$. Let it be assumed that the electromagnets 30 are magnetically biased so that the current Jc flowing in the electromagnet 30c causes a reduction of the attraction, which may thus be considered a repelling force, which also acts in the direction of the restoring force $P_R$.

A force acting on a gyro, according to the laws of gyration, produces a gyratory movement of the axis of rotation 22 around the desired axis 32. The direction of this movement is shown in FIG. 2 by the arrow $P_A$ perpendicular to the direction of $P_R$. To damp this movement it is counteracted by a damping force component $P_D$. However, owing to the phase displacement $s$, a current already flows in the electromagnets 30d and 30b at the time when the position of the axis 22 is as shown in FIG. 2, which produces an attractive or repelling force so that a damping force component $P_D$ is produced. It should be borne in mind, that the output signals $I_b$ and $I_d$ which produce this force, do not come from the control device 31 shown in FIG. 2, but from a similarly constructed control device which is associated with the stations b and d. For the sake of simpler representation this is not shown in FIG. 2. For the plane b-d however everything that has been said here applies in the same manner, so that sensor signals S and output signals I are present there which are merely displaced by 90° in relation to those of the plane a-c.

It has already been said that the amount of the phase displacement alters according to the frequency of the signals and that it always leads by an amount between 0° and 90°. The alteration of the amount $s$ of the phase displacement is caused automatically by the phase shifter used, so that at a frequency 0 no phase displacement takes place ($s=0$) while within the range under consideration the phase displacement increases at higher frequency. In this way it is possible to support also a rotor at standstill. In that case the electromagnetic means 25 produce forces in the direction of $P_R$, which restore the axis 22 of rotation into the desired position 32 and/or maintain it there, but no forces in the direction of $P_D$.

Figure 4:
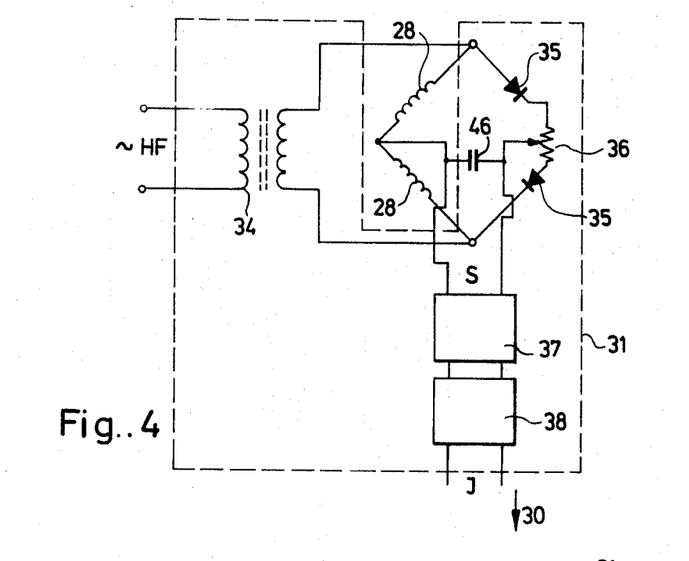
FIG. 4 is a schematic circuit diagram of two sensors and a control device for the bearing system.

FIG. 4 is a schematic circuit diagram of a control device 31. Two sensors 28 which are disposed opposite each other, i.e., two inductive sensors offset relative to one another by 180°, are fed via an isolating transformer 34 with a high-frequency voltage HF. The sensors 28 are arranged with two rectifiers 35 in a bridge circuit, one branch of which is formed by the sensors and the other branch by the rectifiers. The bridge can be trimmed by a potentiometer 36 installed between the rectifiers. The signal voltage S is taken from the bridge between the junction of the sensors and the tap of the potentiometer and passed to a push-pull amplifier 37. The amplified sensor voltage is phase-displaced in a phase shifter 38 in the manner already described and passed as output signal J to the electromagnets which are associated with the sensors 28.

It can be seen that the sensor signals S produced at the sensors 28 are modulated, i.e., they are superposed on the high-frequency voltage HF which may be for example 30 kc./s. By means of the rectifiers 35 and an interposed smoothing capacitor 46 the sensor signals are demodulated, that is the carrier frequency HF is suppressed. By means of the potentiometer 36 it is possible to trim the bridge to obtain a corresponding adjustment of the output values of the sensors 28. It is possible therefore by adjustment of the potentiometer 36 to displace the position of the desired axis 32 of rotation of the corresponding bearing in the plane situated between the sensors 28. This simple possibility of adjustment is very advantageous for an accurate setting of the bearing.

Figure 5:
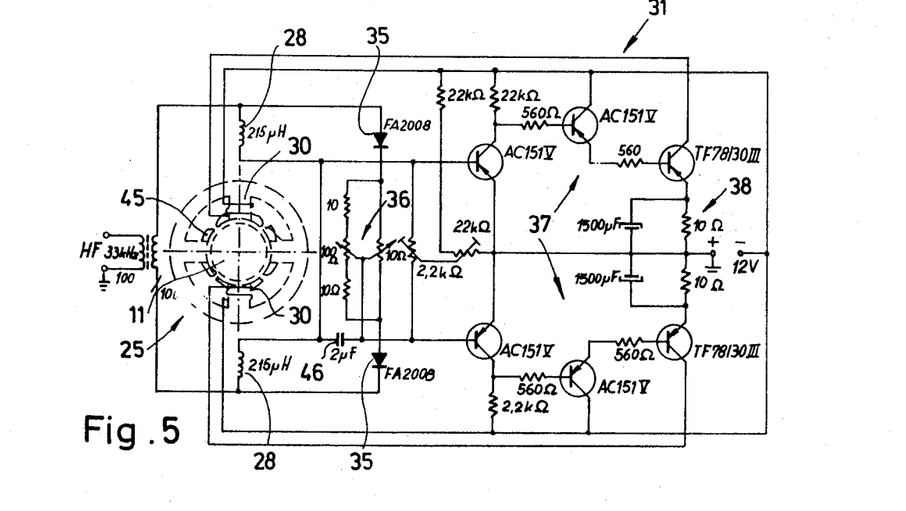
FIG. 5 is a circuit diagram of the control device.

As FIG. 5 shows the construction of the control device 31 is extremely simple. A person versed in the art con construct it easily on the basis of what has been said above. In FIGS. 4 and 5 identical reference numbers have been used. In FIG. 5 the values of the various resistors, capacitors and inductances have been shown and the transistors and rectifiers are identified. It should be mentioned that the phase shifter is of exceedingly simple construction in that it comprises one impedance component for each signal branch, i.e., of a capacitor and a resistor connected in parallel with one another. One control device 31 is used for each vertical plane of a bearing. The two control devices of one bearing may however be combined in space. The desired rotary axis 32 can be adjusted at will by way of the two appropriate potentiometers 36. In FIG. 5 the values of the various resistors, capacitors and inductances of the control device 31 have been indicated. The transistors are identified and are produced by the firm Siemens AG. The rectifier diodes 35 comprise a diode pair FA 2008 produced by the firm SGS Fairchild.

FIG. 6 shows a different embodiment of the upper bearing 13. The housing 12 and the rotor 11 can be substantially the same as those of FIG. 1. The electromagnetic means 25, in their arrangement in the sleeve 24, also correspond to those of FIG. 1. The carrier magnet however is made up of annuli 21' and 21'' stacked upon one another. The sensors 28 are also inductive sensors, they are arranged however with their winding axis vertical and are disposed above the carrier magnet so that the magnetic field of the carrier magnet passes through the windings. The sensors measure the rotor movements by sensing the alterations of the magnetic bias in their cores caused by the rotor movements, i.e., they respond to alterations in the magnetic field of the carrier magnet. The lateral displacements of the rotor are simply translated into sensor signals, since an axial displacement will also produce an alteration of the magnetic field of the carrier magnet, but this will be identical in its effect on the sensors on both sides of the rotor, so that no output signal is produced by the circuitry described in FIGS. 4 and 5. In this embodiment the sensor rings 19 (FIG. 1) on the rotor may be omitted. The bottom bearing may for example be designed as in FIG. 1.

Figure 7:
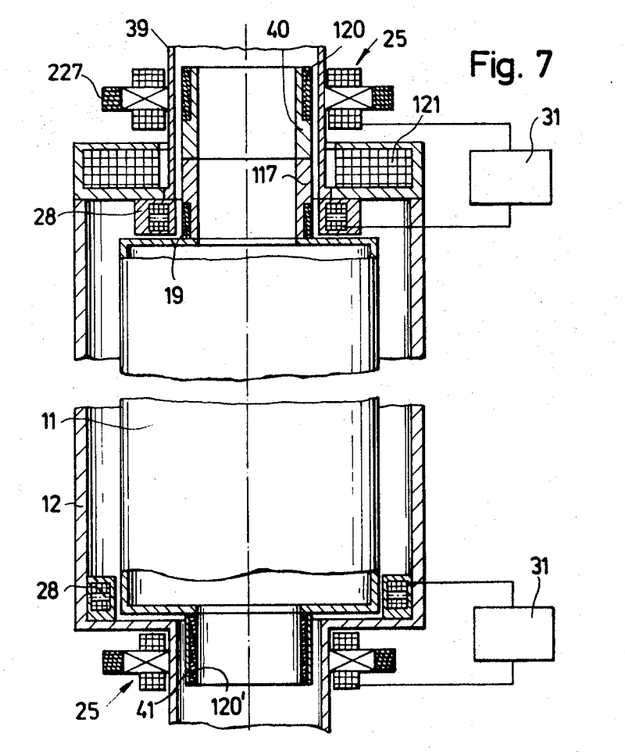

FIG. 7 shows a further embodiment of the invention. Here the electromagnetic means 25 are located above the carrier magnet 121 which in this case is an electromagnet. The portion 30 of the housing 12 at the end of the rotor consists of nonmagnetic, electrically conducting material. The ring 120 of the rotor facing the electromagnetic means 25 corresponds to the ring 20 in FIG. 1 and is made up of laminated transformer sheet rings. It is carried by a sleevelike part 40 of non-ferromagnetic material. The part 40 forms the top end of the rotor and is fixed to a ring 117 of ferromagnetic material which, like the ring 17, cooperates magnetically with the carrier magnet. The sensors 28 are encased in the manner already described and are positioned below the carrier magnet and face the sensor rings 19.

The lower bearing in FIG. 7 has electromagnetic means 25 which cooperate with a ring 120' of a material like that of the ring 20. The ring 120' is surrounded and held together by a connecting ring 41 of nonmagnetic material of as high a DC resistance as possible.

The sensors 28 are arranged in the housing adjacent the larger diameter region of the rotor and directly cooperate with the rotor. The principle of operation corresponds to that already described. While it is possible in the embodiments of FIGS 1 and 6 to keep the electromagnetic means 25 small the embodiment of FIG. 7 is distinguished in that the end of the rotor is largely kept free of bearing components which may be advantageous for different applications.

Figure 8:
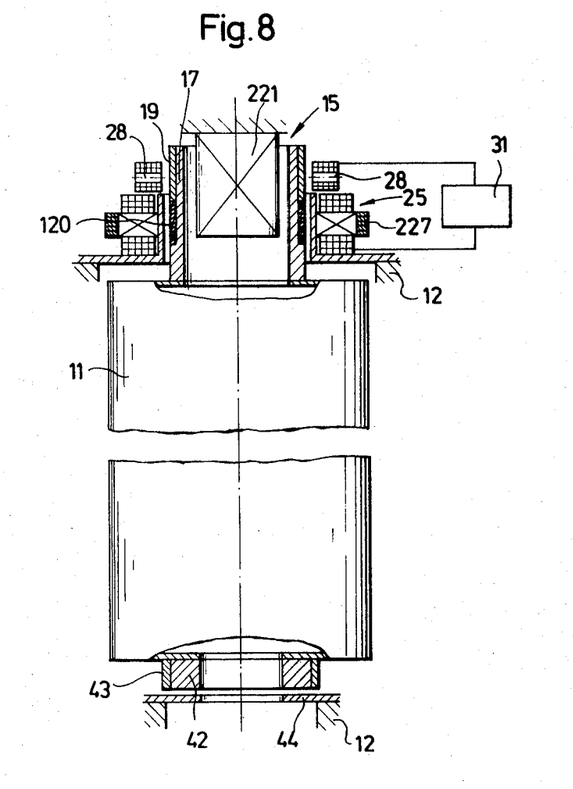

FIG. 8 shows an embodiment wherein the carrier magnet 221 has the form of an axially polarized permanent bar magnet which projects into the hollow rotor end 15. The latter consists of a steel ring 17 which carries sensor rings 19 and ferromagnetic rings 120. As in the embodiment of FIG. 7 the electromagnetic means 25 consist of a stator 227 made up of laminations and embracing the top end of the rotor with four electromagnet windings offset by 90° and disposed on poles projecting inwards. The inductive sensors 28 are arranged above the electromagnetic means 25.

A stabilizing device is required at the upper bearing at which a carrier magnet is disposed. Since the carrier magnet holds the rotor steady in the vertical direction, but a possible equilibrium in the horizontal direction is unstable, a stabilizing device is required in the case of this bearing, since otherwise the rotor, at the slightest deflection, is subjected to an attraction in this direction by the carrier magnet. If, however, the rotor is suspended above its center of gravity, as is the case in FIG. 8, it will be sufficient, merely to damp the deflections occurring at its bottom end. Thus the rotor is suspended in steady balance from the upper bearing, the force of gravity permanently endeavouring to restore it to a vertical position. In FIG. 8 the device for the damping of the vibration at the lower end of the rotor comprises a permanent annular magnet 42 which is radially magnetized and which is fixed to the rotor in alignment with its axis. It is surrounded by a ferromagnetic cylinder 43 which absorbs the centrifugal forces of the mechanically weak permanent magnetic material and which gives a more favorable flux distribution to the magnetic field of the annulus 42. It is also possible to use an axially magnetized ring without cylinder 43. A metal disc 44 is fitted to the stationary part or on the housing 12 and faces the annulus 42 so that the annulus is penetrated by the magnetic field. When the rotor runs quietly, i.e., without vibrations of its axis, no effects result in the metal disc 44 owing to the rotationally symmetrical magnetic field of the ring 42. If the axis should begin to vibrate, however, transient variations of the magnetic field strength are set up in the metal disc 44 and eddy currents are induced and damp these vibrations and thus quieten the rotor 11 again. The permanent annular magnet 42 and the metal disc 44 thus cooperate in the case of vibrations in the manner of an eddy-current brake.

FIG. 9 shows schematically a further embodiment of the magnetic bearing system in accordance with the invention. Here the upper and lower bearings 13' and 14' are substantially of identical construction. They are each equipped with a carrier magnet 21 in form of a permanent annular magnet which collaborates with a ferromagnetic ring 120' at the rotor ends. The sensors 128 are magneto-resistive plates which are arranged in a region where they are cut by the magnetic field of the carrier magnet 31. These magneto-resistive plates are conventional semiconductor elements whose electric resistance depends on the magnetic filed strength penetrating them. They indicate in the manner already described with reference to FIG. 6 the horizontal positional changes of the rotor. The changes in resistance, as a function of distance, supplied by the magneto-resistive plates form the sensor signals which are amplified and phase-displaced in the above-described manner to produce output signals I. In this case a high-frequency supply is not required and therefore demodulation is eliminated. Semiconductor-magneto-resistive plates of the type FP 30 L 100 E supplied by the firm Siemens &

Halske AG have been used successfully. Such magneto resistive plates and their application have been described in the publication: "Siemens-Zeitschrift" 1968, issue No.4.

The electromagnetic means 25 are substantially similar to those described with reference to FIG. 8, but they are arranged immediately underneath the carrier magnet 21 so that they are situated in the magnetic field of the carrier magnet. If they are fed with the output signals I they alter the destabilizing, horizontal components of the magnetic field of the associated carrier magnets in such a way that the restoring and damping force components result from the total effect upon the rotor. Thus no appreciable separate magnetic field is built up by the stabilizing device, but merely the magnetic field of the carrier magnet is suitably modified. This is usually more homogeneous so that the eddy-current losses in the rotor are diminished and, what is very important in many applications, the rise in temperature of the rotor remains small. The diminution of the eddy-current losses and of the rise in temperature of the rotor is also favored by the construction of the rings 20, 120, 120' of transformer sheet rings or encased ferrite material.

Figure 10:
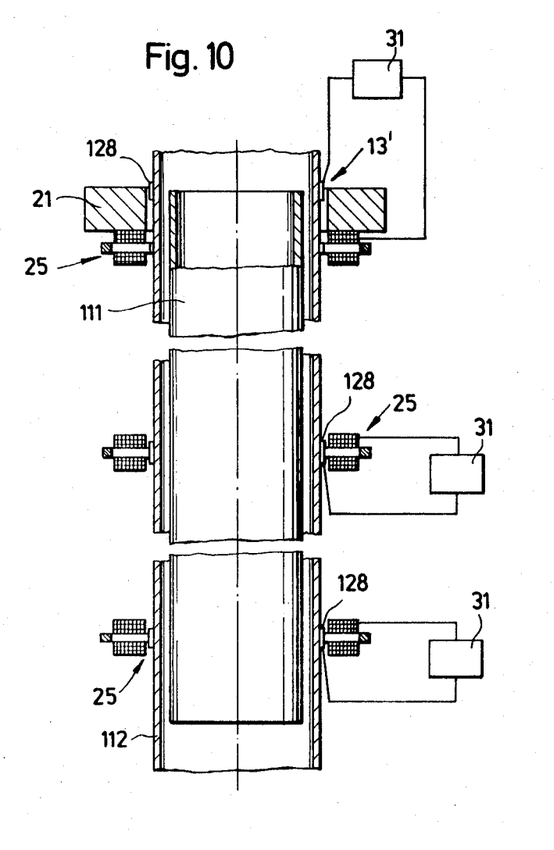

FIG. 10 shows an embodiment wherein the rotor 111 comprises an uninterrupted hollow cylinder of ferromagnetic material, for example steel. The housing 112 is also an uninterrupted cylinder but consists of nonmagnetic material. A bearing 13' which is similar to that of FIG. 9, is arranged outside the housing at the top end of the rotor. Two stabilizing devices, which comprise the above-described electromagnetic means 25 and sensors 128 in the form of magnetoresistive plates, are arranged beneath the upper bearing 13'. The magnetic field required for the generation of sensor signals in the magnetoresistive plates is produced by magnetic biasing of the electromagnetic means. The lower stabilizing devices cooperates directly with the rotor wall. The arrangement of a triple or multiple bearing as shown in FIG. 10 may be of advantage in very long and flexible rotors so as to suppress any bending oscillations at their points of origin.

Figure 11:
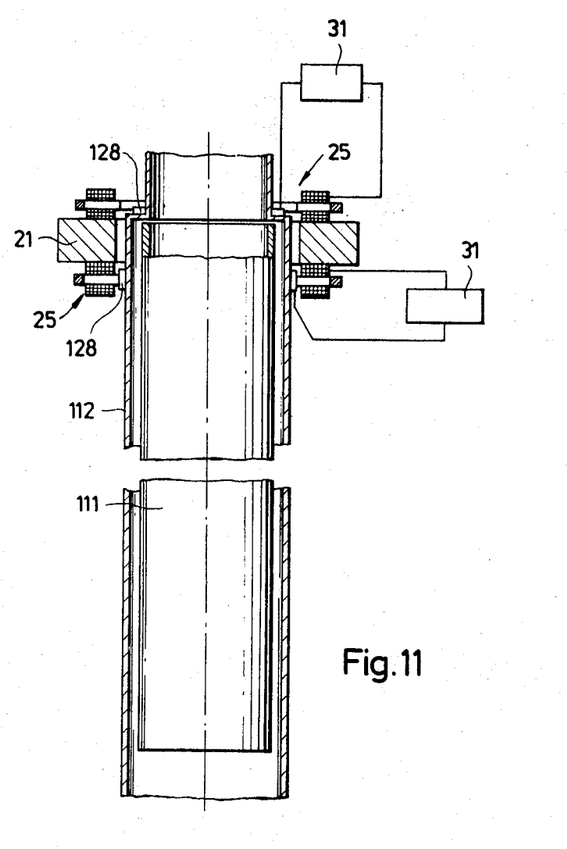

In the embodiment of FIG. 11 the rotor 111 constructed as shown in FIG. 10 is suspended only at its upper end by a double bearing which comprises a carrier magnet in form of a permanent annular magnet 21 and electromagnetic means 25 arranged above and below the annulus 21. The corresponding sensors 128 may be magnetoresistive plates of the type above described or any other type of distance sensors (inductive, capacitive or photoelectric sensors). The electromagnetic means 25 are associated with the carrier magnet 25 in the manner described with reference to FIG. 9 and modify the magnetic field of the carrier magnet. The carrier magnet at the same time provides a magnetic biasing of the electromagnetic means 25. By means of the possibly different alterations of the magnetic field above and below the carrier magnet the magnetic field of the carrier magnet is altered not only, as described with reference to FIG. 9 in a horizontal plane, but also in a vertical plane, so that the rotor is subjected, instead of to the horizontal restoring and damping forces, to appropriate moments which may make a separate lower bearing dispensable. The electromagnetic means normally comprise four electromagnet poles facing one another, which are arranged in the form of a cross (FIGS. 1 and 6) or in the form of a stator of a DC motor (FIGS. 7 to 11). Although in fact only three facilities of influencing are absolutely essential for the stabilizing magnetic field, the four magnetic poles do create a particularly simple stabilizing device and one which can easily be allocated to the corresponding sensors.

To avoid eddy-current losses on the associated rotor parts it is advantageous to make the magnetic field produced by the electromagnetic means as homogeneous as possible. For this purpose, as indicated in FIG. 5, the different poles of the electromagnets 30 may be provided with poleshoes 45 which make the magnetic field more homogeneous. It has been found to be particularly advantageous to make the electromagnetic means in the form of a rotating field stator, i.e., the stator of a three phase induction motor.

The drive of the rotor, although it can be effected in any appropriate contact-free manner, is preferably effected electrically by a rotating field which is produced for example by a rotating field stator arranged around the rotor. This rotating field which naturally must have the required frequency for the high speed of the rotor, carries the rotor with it in the manner of an asynchronous or eddy-current motor, in the case wherein the rotor comprises non-ferromagnetic material. In case of a rotor of ferromagnetic material the rotor may also act as hysteresis rotor. A substantial structural simplification results if one of the electromagnetic means itself is subjected to the rotating field serving for the drive. This may be effected with any of the electromagnetic means shown. It is only necessary to adapt the design of the windings and of the stator sheeting to the higher currents. A further step to reduce the heat produced in the rotor by the bearing system consists in making the sleeves 24 or parts of the housing 29, i.e., all those parts which are situated between the magnetic means 25 and the rotor, of a monmagnetic, electrically conductive material. In such material any magnetic field components of high frequency currents which are produced by the electromagnetic means without being required for the bearing system, are destroyed by eddy-current formation, so that the heat remains outside the rotor.

Advantages of the above described bearing systems will now be apparent. A maintenance-free, extremely durable and contact-free bearing system is provided which enables a stable position of the rotor to be obtained at the highest speeds as well as at standstill. By virtue of the fact that the bearing system needs no bushings or points of sealing it is suitable in particular for the support of rotors in vacuum and/or in aggressive media. By suitable arrangement (FIGS. 7 and 9 to 11) the ends of the rotor or of the housing can be kept free which is important for the input and output of media. A great advantage is in particular the fact that no lubrication whatever is required. In the previous mechanical bearing systems of vacuum pumps or the like vapourization of the lubricants represented a great problem. Extra pumps had to be used to extract the vapors of the lubricants. The control devices required as shown by way of example in FIG. 5 are of exceedingly simple construction and can be produced therefore with great operational safety and at low cost. The total expenditure represents only a fraction of the costs required for the corresponding mechanical bearings. With the bearing in accordance with the invention speeds of 50,000 revolutions per minute can be achieved without any trouble. A great advantage represents the ready adjustability of the desired axis 32. It is possible therefore to adjust the rotor during operation in the manner where it operates at a minimum resistance. This possibility also advantageously affects the precision required in the construction of a device provided with the bearing system in accordance with the invention.

Numerous variants from the embodiments represented and described are possible within the scope of the invention without departing from the scope of the invention. For example, the phase shifter in the control device 31 may be followed by an output amplifier and the input amplifier may be omitted. If the magnetic field of the magnetic means is sufficiently homogeneous or in fields of application where losses in efficiency or rise in temperature of the rotor do not matter, the design of the rotor parts to ensure low eddy current loss or hysteresis may be omitted. In addition to the types of sensors mentioned other galvanomagnetic structural elements such as magnetic diodes, magnetic transistors, Hall probes etc. may be used. Also capacitive distance pickups operating like a capacitor may be used. Although by the use of electromagnets as carrier magnets it may be possible at equal size to achieve greater load-carrying capacity or adaptation of the load-carrying -carrying capacity, the use of permanent magnets is considerably more economical on energy and excludes interruption owing to power failure etc. The extraordinarily low powers required for horizontal stabilization (in the order of magnitude of a few Watt) can easily be supplied by emergency batteries in case of a power failure.

We claim:

1. In a magnetic bearing system for journaling a rotor in a stationary member for rotation about a substantially vertical axis without mechanical contact between the rotor and the stationary member, said rotor comprising ferromagnetic portions, a carrier magnet acting upon at least one of said ferromagnetic portions for supporting said rotor in axial direction, said carrier magnet producing a magnetic field with a vertical component for maintaining the rotor in a stable vertical position, said bearing system including a controlled stabilizing device disposed in a first horizontal plane on the stationary part, for maintaining the rotor in a specified radial position, said stabilizing device comprising at least two contactless sensors for measuring low and higher frequency deviations of the radial position of the rotor from a predetermined position and producing electrical sensor signals in accordance therewith, an electronic control device for amplifying and phase-displacing the sensor signals to produce output signals and electromagnetic means having at least three coils for producing substantially radially directed magnetic fields influencing at least one of said ferromagnetic portions on the rotor said magnetic fields being controlled in accordance with said output signals in such a way that said influence upon said ferromagnetic portions of the rotor produces a restoring force component restoring the rotor from its deviated position to said predetermined position and a damping force component for counteracting a lateral deflection brought about by the gyroscopic effect of the rotor and for damping such effect, said bearing system further including means disposed in a second horizontal plane for utilizing magnetic fields to achieve at least damping of vibratory movements of the rotor.

2. A magnetic bearing system according to claim 1, in which said electronic control device contains an amplifier and a phase shifter, said phase shifter advancing said output signals in phase with respect to said sensor signals, said phase advancement being between zero and one quarter of the frequency period of the sensor signals, said phase advancement increasing with the frequency of the sensor signals.

3. A magnetic bearing system according to claim 1, in which said means disposed in said second horizontal plane comprises a stabilizing device having at least two contactless sensors, an electronic control device for amplifying and phase displacing the sensor signals to produce output signals and electromagnetic means for producing radially directed stabilizing magnetic fields responsively to said output signals.

4. A magnetic bearing system according to claim 1, wherein said carrier magnet acts upon said rotor at a point situated above the center of gravity of said rotor and wherein said means disposed in said second horizontal plane comprises a magnet disposed on said rotor in the region of the lower end thereof, said magnet producing a magnetic field which is symmetrical about the axis of said rotor, said stationary member having an electrically conductive part, said magnetic field cutting said electrically conductive part.

5. A magnetic bearing system according to claim 2, in which said phase shifter comprises a resistor and a capacitor connected in parallel with said resistor.

6. A magnetic bearing system according to claim 1, in which said stabilizing device comprises a plurality of sensors arranged in opposed pairs and an electronic control device for each pair of sensors, each control device including a high-frequency voltage source connected to the respective pair of sensors, a bridge circuit, said pair of sensors being disposed in one branch of said bridge circuit and a pair of rectifiers being disposed in the other branch thereof, means for tapping an error signal between the pair of sensors and between the pair of rectifiers and a push-pull amplifier for amplifying said error signal.

7. A magnetic bearing system according to claim 6, in which said other branch of said bridge includes an adjustable potentiometer for adjustment of said predetermined position of the rotor.

8. A magnetic bearing system according to claim 1, in which said constant magnetic field produced by said carrier magnet is circularly symmetrical about the axis of the rotor.

9. A magnetic bearing system according to claim 1, in which said carrier magnet comprises a circularly symmetrically magnetized permanent magnet, whose magnetic field contains components parallel to the axis of the rotor.

10. A magnetic bearing system according to claim 9, in which said carrier magnet comprises an annular magnet fitted to said stationary member and encircling a portion of the rotor which cooperates with said annular magnet.

11. A magnetic bearing system according to claim 9, in which said carrier magnet comprises a plurality of permanent magnets.

12. A magnetic bearing system according to claim 9, in which said rotor has a hollow portion and in which said carrier magnet comprises a bar magnet projecting into said hollow portion of said rotor and cooperates therewith.

13. A magnetic bearing system according to claim 1, in which said electromagnetic means comprises at least three electromagnets which are arranged around said ferromagnetic portion of said rotor.

14. A magnetic bearing system according to claim 13, in which said electromagnetic means comprises four electromagnets fitted to the stationary part and lying in a common horizontal plane and in which said stabilizing device includes four sensors, each disposed in the same vertical plane as a corresponding one of said electromagnets.

15. A magnetic bearing system according to claim 1, in which said electromagnetic means comprise a rotating field stator winding cooperating with one of said ferromagnetic portions of said rotor.

16. A magnetic bearing system according to claim 1, in which the electromagnetic means comprise electromagnets with poleshoes almost completely enclosing the entire respective ferromagnetic portion of said rotor.

17. A magnetic bearing system according to claim 1, in which said carrier magnet has a magnetic flux path, said flux path penetrating said electromagnetic means which thereby modifies the magnetic field of said carrier magnet.

18. A magnetic bearing system according to claim 1, having an assembly comprising a carrier magnet and a stabilizing device arranged in each of a plurality of horizontal planes, said assemblies being similar to one another.

19. A magnetic bearing system according to claim 1, which includes a plurality of stabilizing devices arranged on said stationary member and spaced apart longitudinally of said rotor, said rotor having respective ferromagnetic portions facing said stabilizing devices.

20. A magnetic bearing system according to claim 1, in which said rotor consists in its entirety of ferromagnetic material.

21. A magnetic bearing system according to claim 1, in which said rotor has a ring of ferromagnetic material at least in the horizontal plane of said carrier magnet.

22. A magnetic bearing system according to claim 1, in which said carrier magnet and said stabilizing device are disposed at one end of said rotor.

23. A magnetic bearing system according to claim 22, in which said end of the rotor comprises a hollow cylinder of ferromagnetic material.

24. A magnetic bearing system according to claim 1, in which said ferromagnetic portion of said rotor cooperating with said electromagnetic means of said stabilizing device comprises stacked annular laminations insulated from one another and connecting means holding said laminations together to provide low eddy-current and hysteresis loss.

25. A magnetic bearing system according to claim 1, in which said ferromagnetic portion of said rotor cooperating with said electromagnetic means of said stabilizing device comprises soft-magnetic, moulded ceramic material and a sheath for said ceramic material.

26. A magnetic bearing system according to claim 1, in which said rotor has a hollow end and in which said electromagnetic means of said stabilizing device extend into said hollow rotor end.

27. A magnetic bearing system according to claim 1, in which said rotor has a hollow end and in which said sensors of said stabilizing device extend into said hollow rotor end.

28. A magnetic bearing system according to claim 26, further comprising a gastight sleeve of nonmagnetic, electrically conductive material disposed between the electromagnetic means and said rotor end.

29. A magnetic bearing system according to claim 1, in which said stationary member comprises a housing surrounding said rotor and in which said carrier magnet and said stabilizing device are disposed outside said housing.

30. A magnetic bearing system according to claim 1, in which said sensors comprise inductive pickups whose inductance is variable in accordance with their distance from a respective portion of said rotor, said respective portion comprising nonmagnetic electrically conductive material.

31. A magnetic bearing system according to claim 1, in which said carrier magnet is disposed adjacent said sensors and in which said sensors comprise inductive pickups disposed within the influence of the magnetic field of said carrier magnet, the inductance of said inductive pickups being variable by variation of the influence of the magnetic field of the carrier magnet.

32. A magnetic bearing system according to claim 1, in which said sensors comprise capacitive proximity detectors.

33. A magnetic bearing system according to claim 1, in which said sensors comprise photoelectric distance detectors each of which includes a light source and a photocell, said rotor being disposed between said light source and said photocell.

34. A magnetic bearing system according to claim 1, in which said sensors comprise galvanomagnetic semiconductor elements whose electrical characteristics can be influenced by magnetic fields and in which said sensors are arranged in a region where the magnetic field strength alters as a function of the horizontal position of the rotor.

35. A magnetic bearing system according to claim 1, further comprising nonmetallic gas tight material, said sensors being encased in said gastight material.

36. A magnetic bearing system according to claim 1, further comprising means for producing a rotating electric field acting upon said electromagnetic means for rotating said rotor.

* * * * *